United States Patent
Doerr et al.

(10) Patent No.: US 12,472,362 B2
(45) Date of Patent: Nov. 18, 2025

(54) PROGRAMMING DEVICE FOR PROGRAMMING AN IMPLANTABLE MEDICAL DEVICE FOR STIMULATING A HUMAN OR ANIMAL HEART

(71) Applicant: BIOTRONIK SE & Co. KG, Berlin (DE)

(72) Inventors: Thomas Doerr, Berlin (DE); Sergey Ershov, Berlin (DE); Torsten Radtke, Berlin (DE); Ulrich Busch, Berlin (DE); Peter Schneider, Berlin (DE); Stefan Paule, Drosendorf (DE); Frank Becker, Berlin (DE)

(73) Assignee: BIOTRONIK SE & Co. KG, Berlin (DE)

( * ) Notice: Subject to any disclaimer, the term of this patent is extended or adjusted under 35 U.S.C. 154(b) by 614 days.

(21) Appl. No.: 17/770,474

(22) PCT Filed: Oct. 22, 2020

(86) PCT No.: PCT/EP2020/079743
§ 371 (c)(1),
(2) Date: Apr. 20, 2022

(87) PCT Pub. No.: WO2021/078852
PCT Pub. Date: Apr. 29, 2021

(65) Prior Publication Data
US 2022/0379126 A1    Dec. 1, 2022

(30) Foreign Application Priority Data
Oct. 24, 2019 (EP) .................................. 19205046

(51) Int. Cl.
*A61N 1/365* (2006.01)
*A61B 5/0538* (2021.01)
(Continued)

(52) U.S. Cl.
CPC ........ *A61N 1/36521* (2013.01); *A61B 5/0538* (2013.01); *A61N 1/056* (2013.01);
(Continued)

(58) Field of Classification Search
None
See application file for complete search history.

(56) References Cited

U.S. PATENT DOCUMENTS

2008/0306567 A1    12/2008  Park et al.
2012/0290034 A1*   11/2012  Rochat .................. A61B 5/287
                                                607/32
(Continued)

OTHER PUBLICATIONS

International Search Report (PCT/ISA/210) and Written Opinion (PCT/ISA/237) mailed on Jan. 28, 2021, by the European Patent Office as the International Searching Authority for International Application No. PCT/EP2020/079743.

*Primary Examiner* — Mallika D Fairchild
(74) *Attorney, Agent, or Firm* — Buchanan Ingersoll & Rooney PC

(57) ABSTRACT

A programming device for programming an implantable medical device for stimulating a human or animal heart, wherein the following steps are performed: a) allowing to select one of at least two electrode lead configurations for stimulating a human or animal heart, wherein the at least two electrode lead configurations comprise a second electrode lead configuration in which at least one electrode lead is connected to an electrode lead port, the electrode lead port being configured to receive an electrode lead for stimulating a second cardiac region or detecting an electric signal at the second cardiac region, wherein the second cardiac region is a part of a ventricular conduction system of the heart, wherein the at least one electrode lead is intended to be implanted or is implanted in the second cardiac region; b)
(Continued)

generating and releasing a notification signal if the second electrode lead configuration is selected.

14 Claims, 1 Drawing Sheet

(51) Int. Cl.
    *A61N 1/05*           (2006.01)
    *A61N 1/368*        (2006.01)
    *A61N 1/372*        (2006.01)
    *A61N 1/375*        (2006.01)

(52) U.S. Cl.
    CPC ......... *A61N 1/365* (2013.01); *A61N 1/36585* (2013.01); *A61N 1/368* (2013.01); *A61N 1/3684* (2013.01); *A61N 1/37223* (2013.01); *A61N 1/37235* (2013.01); *A61N 1/37247* (2013.01); *A61N 1/37252* (2013.01); *A61N 1/3752* (2013.01)

(56) References Cited

U.S. PATENT DOCUMENTS

| | | | | |
|---|---|---|---|---|
| 2014/0107724 | A1* | 4/2014 | Shuros | A61N 1/3712 607/28 |
| 2017/0080241 | A1* | 3/2017 | Ney | G06F 3/0354 |
| 2019/0022378 | A1* | 1/2019 | Prillinger | A61N 1/3962 |
| 2019/0134404 | A1* | 5/2019 | Sheldon | A61N 1/3956 |
| 2019/0290900 | A1 | 9/2019 | Esteller et al. | |

\* cited by examiner

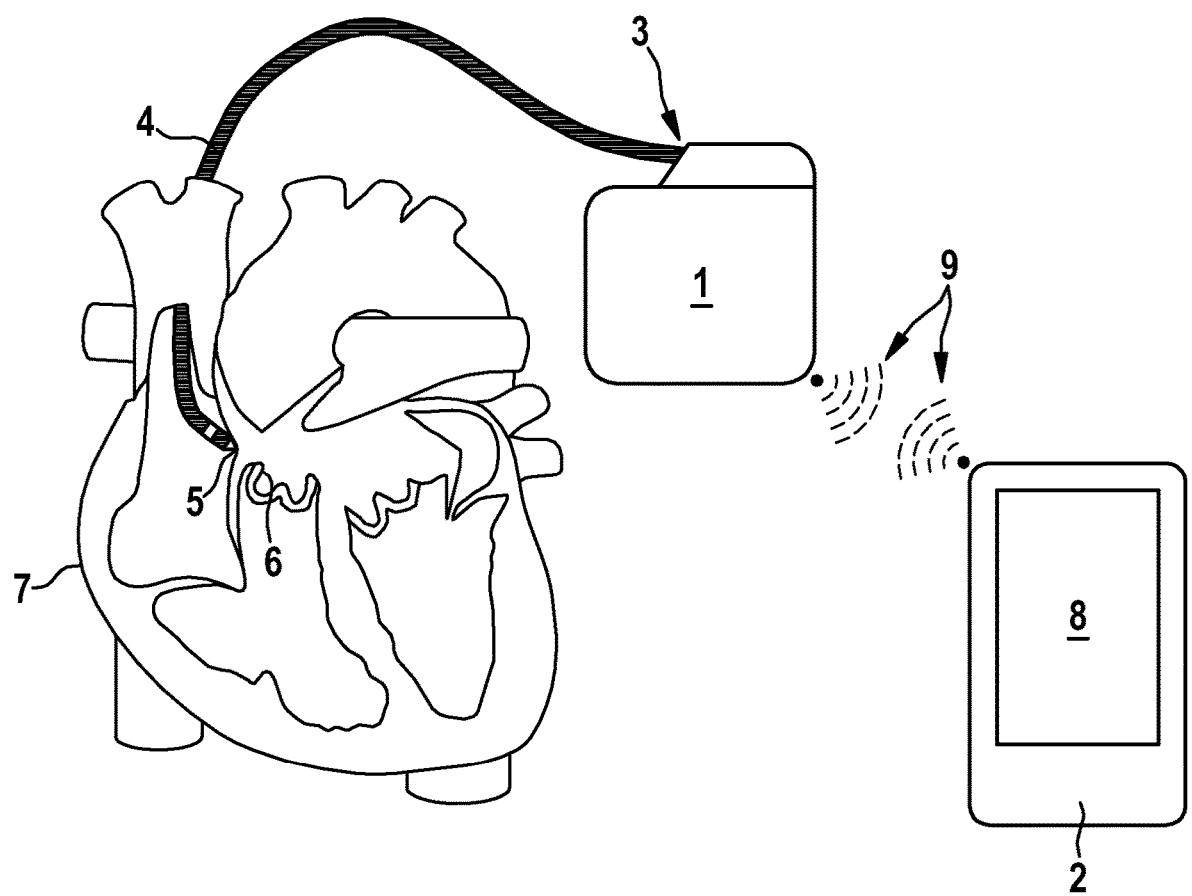

PROGRAMMING DEVICE FOR PROGRAMMING AN IMPLANTABLE MEDICAL DEVICE FOR STIMULATING A HUMAN OR ANIMAL HEART

CROSS-REFERENCE TO RELATED APPLICATIONS

This application is the United States National Phase under 35 U.S.C. § 371 of PCT International Patent Application No. PCT/EP2020/079743, filed on Oct. 22, 2020, which claims the benefit of European Patent Application No. 19205046.6, filed on Oct. 24, 2019, the disclosures of which are hereby incorporated by reference herein in their entireties.

TECHNICAL FIELD

The present invention relates to a programming device, to a computer program product, to an arrangement comprising such a programming device and an implantable medical device, and to a method for programming an implantable medical device with such a programming device.

BACKGROUND

Implantable medical devices for stimulating a human or animal heart, such as pacemakers, have been known for a long time. They can perform different functions. Different stimulation programs can be carried out by an appropriate pacemaker to restore the treated heart to a normal state. Pacemakers are also known to stimulate the His bundle.

The His bundle is a bundle of specific heart muscle cells that is part of the cardiac conduction system. The His bundle is located distally of the atrioventricular node towards the apex of the heart. The His bundle forms part of the ventricular conduction system.

There exist specific devices adapted for His bundle pacing, wherein a detecting (sensing) and stimulation electrode is not implanted into the ventricle of the human or animal heart to be treated, but rather at or near to the His bundle of the heart. Such use of a His bundle electrode enables a particularly physiologic stimulation of the human or animal heart.

In many cases, conventional pacemakers are used for His bundle pacing. In such a case, the port to which the His bundle electrode is connected is provided with specific stimulation/sensing parameters in order to achieve an appropriate sensing of electric signals at the His bundle and to allow a sufficient but still physiologic stimulation of the His bundle in case His bundle pacing is applied. If the stimulation parameters are adjusted at a later stage (e.g., upon follow-up care), there is the risk that conventional stimulation/sensing parameters are chosen instead of the stimulation/sensing parameters specifically adapted for His bundle pacing (e.g., because the responsible physician is not aware that the pacemaker was implanted for His bundle pacing). In such a case, the efficiency of the stimulation will be lost and the patient is acutely put at risk.

The present disclosure is directed toward overcoming one or more of the above-mentioned problems, though not necessarily limited to embodiments that do.

SUMMARY

It is an object of the present invention to provide a possibility to enable safe operation of an implantable medical device for stimulating a human or animal heart even in case that an atypical electrode lead configuration is applied, such as an electrode lead configuration appropriate for His bundle pacing.

At least this object is achieved with a programming device for programming an implantable medical device for stimulating a human or animal heart having the features of claim 1. Such a programming device comprises a first processor and a first memory unit. The first memory unit comprises a first computer-readable program that causes the first processor to perform the steps explained in the following when executed on the first processor.

In a first step, a selection of one out of at least two electrode lead configurations of an implantable medical device for stimulating a human or animal heart is made possible. In this context, the at least two electrode lead configurations comprise a first electrode lead configuration and a second electrode lead configuration.

In the first electrode lead configuration, each electrode lead of the implantable medical device is connected to an electrode lead port of the implantable medical device. In this context, the electrode lead port is configured to receive an electrode lead for stimulating a first cardiac region or for detecting an electric signal at the first cardiac region. The first cardiac region is at least one region chosen from an atrium, a left ventricle and a right ventricle (excluding the ventricular conduction system) of the heart to be stimulated or from which electric signals are to be detected. Each electrode lead is intended to be implanted or is implanted in a cardiac region that corresponds to the first cardiac region of the electrode lead port to which the electrode lead is connected. To give an example, if the electrode lead port is intended to receive an electrode lead to be implanted in the right atrium of the heart, then an electrode lead is connected to this electrode lead port that is in fact intended to be implanted in the right atrium or is implanted in the right atrium. Thus, each electrode lead is connected to that electrode lead port that is originally intended to receive the respective electrode, considering the (intended) site of implantation of the electrode lead. Thus, the first electrode lead configuration can also be denoted as typical electrode lead configuration.

In the second electrode lead configuration, at least one electrode lead of the implantable medical device is connected to an electrode lead port of the implantable medical device. In this case, however, the electrode lead port is configured to receive an electrode lead for stimulating a second cardiac region or for detecting an electric signal at the second cardiac region. The second cardiac region is a part of the ventricular conduction system of the heart (but not the atrium, the right ventricle nor the left ventricle per se). Furthermore, the at least one electrode lead is intended to be implanted in the second cardiac region. Typically, the ventricular conduction system of the heart is not directly contacted by an electrode lead of an implantable medical device for stimulating the human or animal heart. Therefore, this second electrode lead configuration can also be denoted as an atypical electrode lead configuration. It can also be applied in cases in which the implantable medical device comprises an electrode lead port that is originally intended for receiving an electrode for stimulating the atrium, the right ventricle or the left ventricle of the heart or to receive electric signals from those cardiac regions. In such a case, it is nonetheless possible to connect an electrode lead to this electrode lead port, wherein the electrode lead is intended to be implanted or is implanted in the second cardiac region, i.e., in a part of the ventricular conduction system of the heart. Then, the sensing/stimulation parameters applied via the electrode lead port to the electrode lead are specifically adapted to this atypical site of implantation of the electrode lead, resulting in a specific configuration of the respective electrode lead port.

The second electrode lead configuration is an electrode lead configuration that is not typically expected in an implantable medical device for stimulating the human or animal heart. Rather, in most cases the first electrode lead configuration, i.e., the typical electrode lead configuration, is likely to be present in such an implantable medical device.

If the second electrode lead configuration is selected, a notification signal is generated and released. Such a notification signal facilitates informing a user of the programming device and/or of an associated implantable medical device on the second electrode lead configuration so that subsequent programming operations performed with the programming device can be done under consideration of the selected electrode lead configuration.

As a result, the risk of inadvertently applying sensing/stimulation parameters that are appropriate for a typical electrode lead configuration (like the first electrode lead configurations), but not for an atypical electrode lead configuration (such as the second electrode lead configuration), to an implantable medical device comprising an atypical electrode lead configuration is significantly reduced. Consequently, the programming device enables a safe operation of implantable medical devices that may be operated under an atypical electrode lead configuration, namely, implantable medical devices for stimulating a part of the ventricular conduction system of a heart.

In an embodiment, the notification signal comprises at least one of a notification of the selected electrode lead configuration, an information of the selected electrode lead configuration, a warning, a specific color, and a specific sound. Thus, it is possible to apply visual or acoustic aids in order to make it easier for a human user of the programming device to be aware of the generated and released notification signal. A combination of a graphic notification and a specific color of this graphic notification is a particularly appropriate visual aid for depicting the notification signal.

In an embodiment, the second cardiac region is at least one chosen from the His bundle and a left bundle branch. The left bundle branch is a part of the His bundle and thus forms part of the ventricular conduction system. If an electrode lead is implanted at or near to the His bundle, His bundle pacing is made possible. If an electrode lead is implanted at or near to the left bundle branch, left bundle branch pacing is made possible. These two types of pacing the ventricular conduction system are particularly physiologic forms of stimulating a heart.

In an embodiment, the first computer-readable program causes the first processor not to generate a notification signal if the first electrode lead configuration is selected. Thus, the notification signal can be considered as a flag that is set in case of the second electrode lead configuration being selected and that is not set in case of the first electrode lead configuration being selected.

In an embodiment, at least one further electrode lead of the implantable medical device is connected to a further electrode lead port of the implantable medical device in the second electrode lead configuration. In this context, the further electrode lead port is configured to receive an electrode lead for stimulating the first cardiac region or for detecting an electric signal at the first cardiac region. Furthermore, the at least one further electrode lead is intended to be implanted or is implanted in the first cardiac region. As explained above, the first cardiac region is a region chosen from the atrium, the right ventricle (excluding the ventricular conduction system) and the left ventricle of the respective heart. Thus, it is possible that not only an electrode lead for stimulating the ventricular conduction system is present in the second electrode lead configuration, but also further electrode leads that are implanted at a typical implantation site such as the right atrium, the right ventricle and/or the left ventricle.

In an embodiment, the second electrode lead configuration comprises an atrial electrode lead and a His bundle electrode lead. The atrial electrode lead is intended to be implanted, or is implanted, in the right atrium of the heart to be stimulated. Furthermore, the atrial electrode lead is connected to an atrial electrode lead port of the implantable medical device. The His bundle electrode lead is intended to be implanted or is implanted at or near to the His bundle of the same heart and is connected to a right ventricular electrode lead port or a His bundle electrode lead port. If the right ventricular electrode lead port is used for receiving the His bundle electrode lead, it is specifically configured for His bundle pacing so that the applied sensing/stimulation parameters are particularly appropriate for sensing electric signals at the His bundle or for stimulating the His bundle of the heart.

In an embodiment, the second electrode lead configuration comprises an atrial electrode lead, a left ventricular electrode lead and a His bundle electrode lead. The atrial electrode lead is connected to an atrial electrode lead port of the implantable medical device. The His bundle electrode lead is connected to a right ventricular electrode lead port or a His bundle electrode lead port. The left ventricular electrode lead is implanted in an apical region of the left ventricle and is connected to a left ventricular electrode lead port of the implantable medical device. Such an electrode lead configuration is particularly appropriate for applying a cardiac resynchronization therapy.

In an embodiment, the second electrode lead configuration comprises an atrial electrode lead, a His bundle electrode lead and a right ventricular electrode lead. The atrial electrode lead is connected to an atrial electrode lead port of the implantable medical device. The His bundle electrode lead is connected to a right ventricular electrode lead port or a His bundle electrode lead port. The right ventricular electrode lead is intended to be implanted or is implanted in the right ventricle in an apical region thereof. Furthermore, it is connected to a right ventricular electrode port (if such right ventricular electrode port is still available and not occupied by the His bundle electrode lead). Otherwise, the right ventricular electrode lead is connected to the left ventricular electrode port of the implantable medical device. In such a case, sensing/stimulation parameters are applied to the left ventricular electrode lead port that are appropriate for operating the connected right ventricular electrode lead. This electrode lead configuration enables a right ventricular backup stimulation. Such a backup stimulation can be useful, e.g., if the intended His bundle pacing turns out to be insufficient to achieve a typical cardiac contraction.

In an embodiment, the second electrode lead configuration comprises the setting explained in the following. On the one hand, the implantable medical device to be programmed comprises only a single electrode lead port, namely, a first electrode lead port. On the other hand, a His bundle electrode lead is connected to the first electrode lead port. This second electrode lead configuration is appropriate for configuring a single chamber implantable medical device for His bundle pacing.

In an embodiment, the second electrode lead configuration comprises the setting explained the following. On the one hand, the implantable medical device to be programmed comprises exactly two electrode ports, namely, a first electrode lead port and a second electrode lead port. On the other hand, a His bundle electrode lead is connected to the first electrode lead port and a right atrial electrode is connected to the second electrode lead port. This second electrode lead configuration is particularly appropriate for a dual chamber implantable medical device specifically adapted for His bundle pacing.

In an embodiment, the second electrode lead configuration comprises the setting explained the following. On the one hand, the implantable medical device to be programmed comprises exactly three electrode lead ports, namely, a first electrode lead port, a second electrode lead port, and a third electrode lead port. On the other hand, three different concrete electrode configurations are possible in this embodiment.

In the first configuration, a His bundle electrode is connected to the first electrode lead port, wherein no electrode is connected to the second electrode lead port. Furthermore, a right ventricular electrode lead is connected to the third electrode lead port. This configuration is particularly appropriate for a triple chamber implantable medical device specifically adapted for His bundle pacing, wherein the right ventricular electrode serves as His bundle electrode backup lead. Such a configuration can be used in case of atrioventricular node ablation scenarios in which no proper atrial sensing/pacing is any longer possible.

In the second configuration, a His bundle electrode is connected to the first electrode lead port, a right atrial electrode lead is connected to the second electrode lead port, and a right ventricular electrode lead is connected to the third electrode lead port. Such a setting is appropriate for physiologic His bundle pacing with a right ventricular electrode as His bundle electrode backup lead.

In a third configuration, a His bundle electrode lead is connected to the first electrode lead port, a right atrial electrode lead is connected to the second electrode lead port, and a left ventricular electrode lead is connected to the third electrode lead port. Such a configuration is particularly appropriate for cardiac resynchronization therapy.

In each of the precedingly explained second electrode lead configurations, a His bundle electrode lead is present. In other embodiments, the His bundle electrode lead is replaced by a left bundle branch electrode lead or another ventricular conduction system electrode lead, while maintaining the other electrodes as explained above. In an embodiment, both a His bundle electrode lead and a left bundle branch electrode lead are present, wherein also the other electrode leads as explained above are present.

In an embodiment, the first computer-readable program causes the first processor to make the notification signal permanently available for a user of the programming device. Such a permanent availability guarantees in a particularly reliable way that the risk of using the programming device for applying an inappropriate electrode configuration to the associated implantable medical device is significantly reduced. Such a permanent availability of the notification signal can be realized, e.g., by displaying an information on the generated notification signal on a graphical user interface of the programming device. Such information can be, e.g., displayed on a starting screen of the graphical user interface or on one or more (particular all) sub-pages of the graphical user interface. It is particularly appropriate if such an information on the generated notification signal is displayed on a part of the graphical user interface that is used for assigning a specific electrode configuration to an implantable medical device.

In an embodiment, the generated notification signal restricts the possibility of selecting electrode lead configurations other than the second electrode lead configuration. In an embodiment, the generated notification signal requires a reset of the notification signal prior to being able to select an electrode lead configuration other than the second electrode lead configuration.

In an embodiment, a further notification signal is generated and released in case that an electrode lead configuration of an implantable medical device is changed to an electrode lead configuration differing from the second electrode lead configuration, if the (first) notification signal has been generated before. In such a case, a user will be generally able to change the electrode lead configuration of the implantable medical device, but will be confronted with the further notification signal in case that the original notification signal has been set in the past.

In an embodiment, the first computer-readable program causes the first processor to transfer the notification signal to an appliance remote from the programming device. In doing so, the notification signal can be converted into a data form that is conceivable by the appliance or a user of the appliance. However, it is also possible to transfer the notification signal to the appliance without conversion. The appliance is chosen from the group consisting of a printout (or a printer for making a printout), a database, and a home monitoring system. A particularly appropriate database is a database comprising electronic health records (EHR). To give an example, a clinic information system might be an appropriate database. Upon transferring the notification signal to such an appliance, the notification signal will be available in the appliance at a later time point. Then, it is particularly easy to identify the electrode lead configuration of the specific implantable medical device, even though the programming device might not be at hand at that time point.

In an embodiment, the first computer-readable program causes the first processor to enable a first set of programming functions if the first electrode lead configuration is selected and to enable a second set of programming functions if the second electrode lead configuration is selected. Thus, the programming device enables different sets of programming functions in dependence on the selected electrode lead configuration. In doing so, particularly appropriate sensing/stimulation parameters can be chosen or adjusted for the selected electrode lead configuration. Thus, it may be possible to adjust specific parameters if the first electrode lead configuration is selected and different parameters if the second electrode lead configuration is selected.

In an embodiment, at least one further electrode lead of the implantable medical device is connected to a further electrode lead port of the implantable medical device in the second electrode lead configuration. In this embodiment, the further electrode lead port is configured to receive an electrode lead for stimulating the first cardiac region (i.e., the atrium, the right ventricle or the left ventricle of the heart) or for detecting an electric signal at the first cardiac region. Furthermore, the at least one further electrode lead is intended to be implanted, or is implanted, in the first cardiac region. Additionally, the first computer-readable program causes the first processor to adjust the second set of programming functions in dependence on the choice of the first cardiac region, i.e., if the at least one further electrode lead is implanted (or is intended to be implanted) in the atrium, in the right ventricle or in the left ventricle of the heart. Thus, this embodiment enables a very specific adjustment of a programming surface to facilitate programming of the implantable medical device by a user. Unnecessary functions can be deactivated, whereas necessary or optional functions for the specific electrode lead configuration selected for the implantable medical device are activated. Then, very specific modifications of sensing/stimulation parameters can be performed taking into account the specific electrode lead configuration of the implantable medical device to be programmed with the programming device.

In an aspect, the present invention relates to a computer program product comprising computer-readable code that causes the processor to perform the steps explained in the following when executed on the processor.

In a first step, a selection of one out of at least two electrode lead configurations of an implantable medical device for stimulating a human or animal heart is made possible. In this context, the at least two electrode lead configurations comprise a first electrode lead configuration and a second electrode lead configuration.

In the first electrode lead configuration, each electrode lead of the implantable medical device is connected to an electrode lead port of the implantable medical device. In this context, the electrode lead port is configured to receive an electrode lead for stimulating a first cardiac region or for detecting an electric signal at the first cardiac region. The first cardiac region is at least one region chosen from an atrium, a left ventricle and a right ventricle (excluding the ventricular conduction system) of the heart to be stimulated or from which electric signals are to be detected. Each electrode lead is intended to be implanted or is implanted in a cardiac region that corresponds to the first cardiac region of the electrode lead port to which the electrode lead is connected.

In the second electrode lead configuration, at least one electrode lead of the implantable medical device is connected to an electrode lead port of the implantable medical device. In this case, however, the electrode lead port is configured to receive an electrode lead for stimulating a second cardiac region or for detecting an electric signal at the second cardiac region. The second cardiac region is a part of the ventricular conduction system of the heart (but not the atrium, the right ventricle nor the left ventricle per se). Furthermore, the at least one electrode lead is intended to be implanted in the second cardiac region. Typically, the ventricular conduction system of the heart is not directly contacted by an electrode lead of an implantable medical device for stimulating the human or animal heart. Therefore, this second electrode lead configuration can also be denoted as an atypical electrode lead configuration.

If the second electrode lead configuration is selected, a notification signal is generated and released.

In an aspect, the present invention relates to an arrangement of the programming device according to the preceding explanations and an implantable medical device for stimulating a human or animal heart. In addition to the components explained above, the programming device also comprises a first data communication unit. Furthermore, the implantable medical device comprises a second processor, a second memory unit, a second data communication unit, a stimulation unit, and a detection unit. The stimulation unit is configured to stimulate a cardiac region of a human or animal heart. The detection unit is configured to detect an electric signal at a cardiac region of the same heart. The stimulation unit and the detection unit comprise an electrode lead. This electrode lead can be the same or a different for the stimulation unit and the detection unit. By such an arrangement, it is possible to use the programming device for programming the implantable medical device, e.g., to set specific stimulation/sensing parameters.

In an embodiment, the active implantable medical device is an implantable pulse generator (IPG), an implantable cardioverter-defibrillator (ICD), or a device for cardiac resynchronization therapy (CRT).

In an embodiment, the first data communication unit and the second data communication unit serve for transferring data from the programming device to the implantable medical device and/or in the opposite direction, i.e., from the implantable medical device to the programming device. Thus, the programming device cannot only be used to program the implantable medical device, but also to read out specific settings of the implantable medical device.

In an embodiment, the data communication units serve for transferring data in a wireless manner. All standard data transmission protocols or specifications are appropriate for such a wireless data communication. Examples of standard data transmission protocols or specifications are the Medical Device Radiocommunications Service (MICS), the Bluetooth Low Energy (BLE) protocol and the Zigbee specification.

In an embodiment, the second memory unit comprises a second computer-readable program that causes the second processor to perform the steps explained in the following when executed on the second processor.

First, a dataset is received with the second data communication unit. This dataset comprises an appropriate sensing parameter and or stimulation parameter for an electrode lead configuration of the implantable medical device that was selected on the programming device.

Afterwards, a sensing parameter of the detection unit is set by using the received data set (if the dataset comprises an appropriate sensing parameter). Additionally, or alternatively, a stimulation parameter of the stimulation unit is set by using the received data set (if the received dataset comprises an appropriate stimulation parameter).

In an embodiment, the second memory unit comprises a second computer-readable program that causes the second processor to perform the steps explained in the following when executed on the second processor.

In a first step, a presence of a second cardiac region electrode lead is automatically detected. Such a second cardiac region electrode lead is configured to stimulate the second cardiac region and/or to detect an electric signal at the second cardiac region. As outlined above, the second cardiac region is a part of the ventricular conduction system of the heart. Furthermore, the second cardiac region electrode is intended to be implanted or is implanted in the second cardiac region.

Alternatively, a dataset is received from the second memory unit that indicates such a presence of a second cardiac region electrode. Such a dataset can be generated by the programming device and can be transferred to the implantable medical device after having made a selection of an appropriate electrode lead configuration in the programming device. It is then stored in the second memory unit.

In a further step, the second data communication unit is caused to transfer a dataset indicating the presence of the second cardiac region electrode lead to the first data communication unit. Thus, the implantable medical device is able to actively inform the programming device on a presence of the second cardiac region electrode lead so that the selection of the electrode lead configuration to be made on the programming device can be automatically performed on the basis of such transferred dataset.

To be more precise, in an embodiment, the first computer-readable program causes the first processor to perform the steps explained in the following. First, the dataset indicating the presence of the second cardiac region electrode lead is received with the first data communication unit. Afterwards, the second electrode lead configuration is automatically selected in response to receiving this dataset.

This embodiment is particularly appropriate if a selection of an appropriate electrode lead configuration has already been done at an earlier time point and has been stored in the implantable medical device. If a data connection is established between the implantable medical device and the programming device at a later stage, the programming device can automatically receive an information on a presence of a second cardiac region electrode lead and can thus automatically select the second electrode configuration for subsequent programming purposes. In such a case, a selection of the correct electrode lead configuration is made particularly easy and reliable. This enhances the overall operational safety of the respective implantable medical device.

In an aspect, the present invention relates to a method for programming an implantable medical device for stimulating a human or animal heart with the programming device according to the preceding explanations. In addition to the components explained above, the programming device also comprises a first data communication unit. Furthermore, the implantable medical device comprises a second processor, a second memory unit, a second data communication unit, a stimulation unit, and a detection unit. The stimulation unit is configured to stimulate a cardiac region of a human or animal heart. The detection unit is configured to detect an electric signal at a cardiac region of the same heart. The stimulation unit and the detection unit comprise an electrode lead. This electrode lead can be the same or a different for the stimulation unit and the detection unit. This method comprises the steps explained in the following.

First, a dataset is generated with a programming device. This dataset comprises an appropriate sensing parameter and/or stimulation parameter for an electrode lead configuration selected on the programming device.

Afterwards, the first data communication unit is used for transmitting the data sets to the implantable medical device.

The implantable medical device then receives the dataset with the second data communication unit.

Afterwards, a sensing parameter of the detection unit and/or a stimulation parameter of the stimulation unit is set by using the received dataset.

All embodiments of the described programming device can be combined in any desired way and can be transferred either individually or in any arbitrary combination to the arrangement, to the computer program product, and to the method. Furthermore, all embodiments described with respect to the arrangement can be combined in any desired way and can be transferred either individually or in any arbitrary combination to the described programming device, to the described computer program product, and to the described method. Likewise, all embodiments described with respect to the computer program product can be combined in any desired way and can be transferred either individually or in any arbitrary combination to the described programming device, to the described arrangement, and to the described method. Finally, all embodiments described with respect to the method can be combined in any desired way and can be transferred either individually or in any arbitrary combination to the described programming device, to the arrangement, and to the computer program product.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Further details of aspects of the present invention will be described in the following making reference to exemplary embodiments and an accompanying Figure.

FIG. 1 shows an arrangement of a pacemaker and a programming device.

DETAILED DESCRIPTION

FIG. 1 shows an arrangement of a pacemaker 1 serving as implantable medical device and a programming device 2. The pacemaker 1 comprises a port 3 serving as electrode lead port into which a His bundle electrode lead 4 is inserted. The His bundle electrode lead 4 comprises an electrode pole 5 at its distal end which is implanted at the His bundle 6 of a human heart 7.

The programming device 2 comprises a display 8 for enabling an interaction with a user of the programming device 2. The programming device 2 and the pacemaker 1 are operatively coupled to each other by a wireless radio communication 9. This wireless radio communication 9 is established by a first data communication unit in the programming device 2 and a second data communication unit in the pacemaker 1. Due to this wireless radio communication 9, it is possible to program the pacemaker 1 with the help of the programming device 2.

For carrying out such programming, the programming device 2 first requests a selection between two electrode lead configurations. The first electrode lead configuration is a standard electrode lead configuration with an atrial electrode lead and a right ventricular electrode lead. The second electrode lead configuration is an electrode lead configuration in which a His bundle electrode lead is present. In the present embodiment, the His bundle electrode 4 is connected to the pacemaker 1 so that the second electrode lead configuration is selected. This automatically results in the generation of a notification signal which is stored in the software of the programming device 2. Furthermore, an information on this notification signal is displayed on the display 8 of the programming device 2.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. An arrangement, comprising a programming device and an implantable medical device, the programming device configured for programming the implantable medical device for stimulating a human or animal heart, the arrangement further comprising a first processor and a first memory unit, wherein the first memory unit comprises a first computer-readable program that causes the first processor to perform the following steps when executed on the first processor:
  a) allowing to select one of at least two electrode lead configurations of an implantable medical device for stimulating a human or animal heart, wherein the at least two electrode lead configurations comprise:
    i) a first electrode lead configuration in which each electrode lead of the implantable medical device is connected to an electrode lead port of the implantable medical device, the electrode lead port being configured to receive an electrode lead for stimulating a first cardiac region or detecting an electric signal at the first cardiac region, wherein the first cardiac region is at least one chosen from an atrium, a left ventricle and a right ventricle, wherein each electrode lead is adapted to be implanted in a cardiac region that corresponds to the first cardiac region of the electrode lead port to which the electrode lead is connected, and
    ii) a second electrode lead configuration in which at least one electrode lead of the implantable medical device is connected to an electrode lead port of the implantable medical device, the electrode lead port being configured to receive an electrode lead for stimulating a second cardiac region or detecting an electric signal at the second cardiac region, wherein the second cardiac region is a part of a ventricular conduction system of the heart, wherein the at least one electrode lead is adapted to be implanted in the second cardiac region, wherein the second cardiac region is at least one chosen from a His bundle and a left bundle branch,
  b) generating and releasing a notification signal when the second electrode lead configuration is selected, and
  c) stimulating the human or animal heart via activation of the implantable medical device, wherein the first computer-readable program causes the first processor not to generate a notification signal when the first electrode lead configuration is selected.

2. The arrangement according to claim 1, wherein in the second electrode lead configuration at least one further electrode lead of the implantable medical device is connected to a further electrode lead port of the implantable medical device, the further electrode lead port being configured to receive an electrode lead for stimulating the first cardiac region or detecting an electric signal at the first cardiac region, wherein the at least one further electrode lead is adapted to be implanted in the first cardiac region.

3. The arrangement according to claim 1, wherein the first computer-readable program causes the first processor to make the notification signal permanently available for a user of the programming device.

4. The arrangement according to claim 1, wherein the first computer-readable program causes the first processor to transfer the notification signal to an appliance remote from the programming device, the appliance being chosen from the group consisting of a printout, a database, and a home monitoring system.

5. The arrangement according to claim 1, wherein the first computer-readable program causes the first processor to enable a first set of programming functions when the first electrode lead configuration is selected and a second set of programming functions when the second electrode lead configuration is selected.

6. The arrangement according to claim 5, wherein in the second electrode lead configuration at least one further electrode lead of the implantable medical device is connected to a further electrode lead port of the implantable medical device, the further electrode lead port being configured to receive an electrode lead for stimulating the first cardiac region or detecting an electric signal at the first cardiac region, wherein the at least one further electrode lead is adapted to be implanted in the first cardiac region, and in that the first computer-readable program causes the first processor to adjust the second set of programming functions in dependence on a choice of the first cardiac region.

7. The arrangement according to claim 1, wherein the programming device comprises a first data communication unit and wherein the implantable medical device comprises a second processor, a second memory unit, a second data communication unit, a stimulation unit configured to stimulate a cardiac region of a human or animal heart, and a detection unit configured to detect an electric signal at the cardiac region of the same heart, wherein the stimulation unit and the detection unit comprise an electrode lead.

8. The arrangement according to claim 7, wherein the first data communication unit and the second data communication unit serve for transferring data from the programming device to the implantable medical device and/or for transferring data from the implantable medical device to the programming device.

9. The arrangement according to claim 7, wherein the second memory unit comprises a second computer-readable program that causes the second processor to perform the following steps when executed on the second processor:
  a) receiving, with the second data communication unit, a dataset comprising an appropriate sensing parameter and/or stimulation parameter for an electrode lead configuration selected on the programming device; and
  b) setting a sensing parameter of the detection unit and/or a stimulation parameter of the stimulating unit by using the received dataset.

10. The arrangement according to claim 7, wherein the second memory unit comprises a second computer-readable program that causes the second processor to perform the following steps when executed on the second processor:
  a) automatically detecting a presence of a second cardiac region electrode lead configured to stimulate a second cardiac region or to detect an electric signal at the second cardiac region, wherein the second cardiac region is a part of a ventricular conduction system of the heart, wherein the second cardiac region electrode lead is adapted to be implanted in the second cardiac region, and
  b) causing the second data communication unit to transfer a dataset indicating the presence of the second cardiac region electrode lead to the first data communication unit.

11. The arrangement according to claim 10, wherein the first computer-readable program causes the first processor to perform the following steps:
  a) receiving, with the first data communication unit, the dataset indicating the presence of the second cardiac region electrode lead; and
  b) automatically selecting the second electrode lead configuration in response to receiving this dataset.

12. A computer program product comprising computer-readable code that causes a processor to perform the following steps when executed on the processor:
  a) allowing to select one of at least two electrode lead configurations of an implantable medical device for stimulating a human or animal heart, wherein the at least two electrode lead configurations comprise:
  i) a first electrode lead configuration in which each electrode lead of the implantable medical device is connected to an electrode lead port of the implantable medical device, the electrode lead port being configured to receive an electrode lead for stimulating a first cardiac region or detecting an electric signal at the first cardiac region, wherein the first cardiac region is at least one chosen from an atrium, a left ventricle and a right ventricle, wherein each electrode lead is adapted to be implanted in a cardiac region that corresponds to the first cardiac region of the electrode lead port to which the electrode lead is connected, and
  ii) a second electrode lead configuration in which at least one electrode lead of the implantable medical device is connected to an electrode lead port of the implantable medical device, the electrode lead port being configured to receive an electrode lead for stimulating a second cardiac region or detecting an electric signal at the second cardiac region, wherein the second cardiac region is a part of a ventricular conduction system of the heart, wherein the at least one electrode lead is adapted to be implanted in the second cardiac region, wherein the second cardiac region is at least one chosen from a His bundle and a left bundle branch,
  b) generating and releasing a notification signal when the second electrode lead configuration is selected, and
  c) stimulating the human or animal heart via activation of the implantable medical device, wherein the first computer-readable program causes the first processor not to generate a notification signal when the first electrode lead configuration is selected.

13. A method for programming an implantable medical device for stimulating a human or animal heart with the arrangement according to claim 1, wherein the programming device comprises a first data communication unit and wherein the implantable medical device comprises a second processor, a second memory unit, a second data communication unit, a stimulation unit configured to stimulate a cardiac region of a human or animal heart, and a detection unit configured to detect an electric signal at the cardiac region of the same heart, wherein the stimulation unit and the detection unit comprise an electrode lead, the method comprising the following steps:
  a) generating, with the programming device, a dataset comprising an appropriate sensing parameter and/or stimulation parameter for an electrode lead configuration selected on the programming device;
  b) transmitting, with the first data communication unit, the dataset to the implantable medical device;
  c) receiving, with the second data communication unit, the dataset; and
  d) setting a sensing parameter of the detection unit and/or a stimulation parameter of the stimulation unit by using the received dataset.

14. A programming device for programming an implantable medical device for stimulating a human or animal heart, the programming device comprising a first processor and a first memory unit,
  wherein
  the first memory unit comprises a first computer-readable program that causes the first processor to perform the following steps when executed on the first processor:
  a) allowing to select one of at least two electrode lead configurations of an implantable medical device for stimulating a human or animal heart, wherein the at least two electrode lead configurations comprise:
    i) a first electrode lead configuration in which each electrode lead of the implantable medical device is connected to an electrode lead port of the implantable medical device, the electrode lead port being configured to receive an electrode lead for stimulating a first cardiac region or detecting an electric signal at the first cardiac region, wherein the first cardiac region is at least one chosen from an atrium, a left ventricle and a right ventricle, wherein each electrode lead is adapted to be implanted in a cardiac region that corresponds to the first cardiac region of the electrode lead port to which the electrode lead is connected, and
    ii) a second electrode lead configuration in which at least one electrode lead of the implantable medical device is connected to an electrode lead port of the implantable medical device, the electrode lead port being configured to receive an electrode lead for stimulating a second cardiac region or detecting an electric signal at the second cardiac region, wherein the second cardiac region is a part of a ventricular conduction system of the heart, wherein the at least one electrode lead is adapted to be implanted in the second cardiac region, wherein the second cardiac region is at least one chosen from a His bundle and a left bundle branch,
  b) generating and releasing a notification signal when the second electrode lead configuration is selected, and
  c) stimulating the human or animal heart via activation of the implantable medical device, wherein the first computer-readable program causes the first processor not to generate a notification signal when the first electrode lead configuration is selected.

* * * * *